Patented Mar. 5, 1963

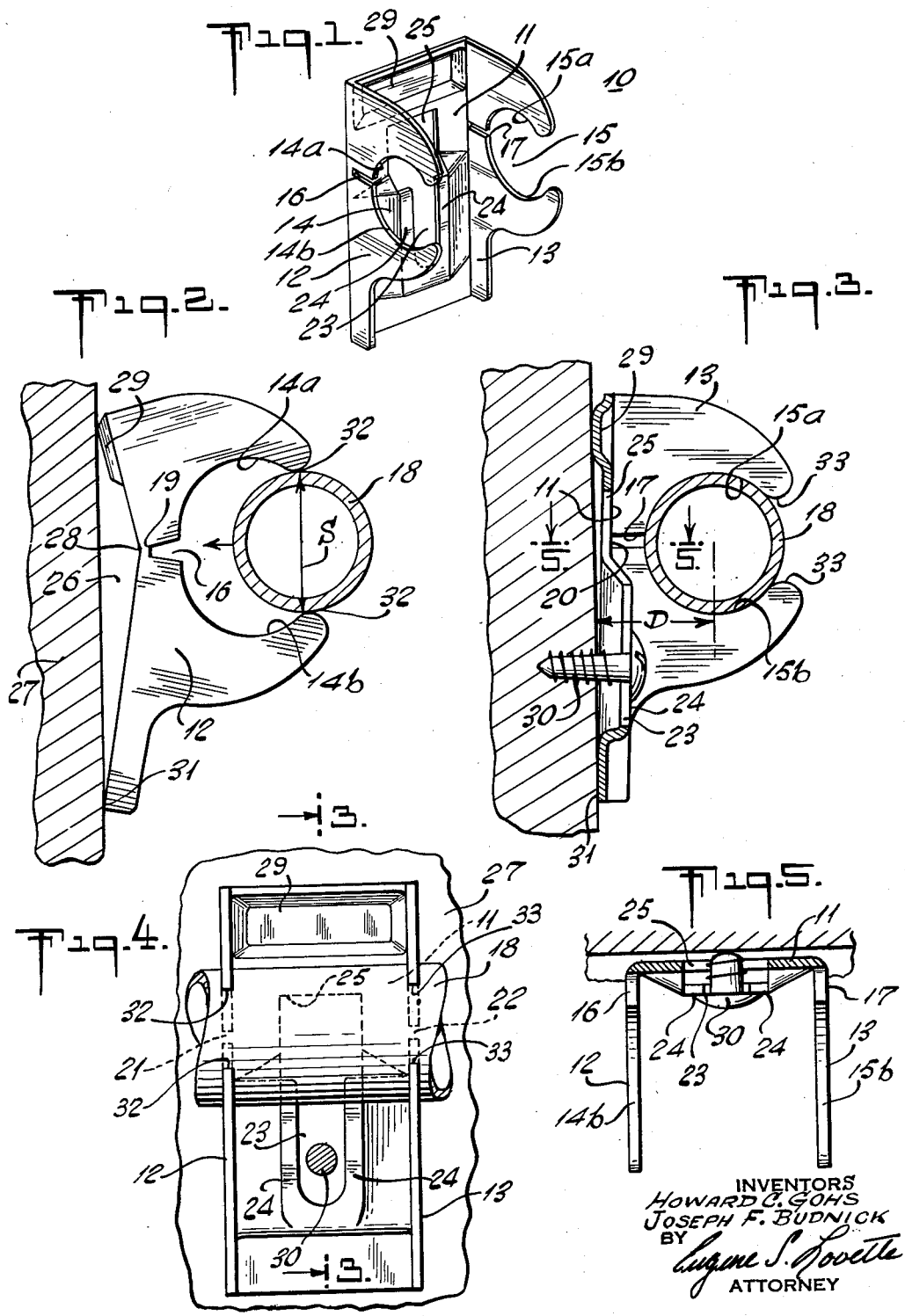

3,080,140
CLAMP FOR CONDUIT OR THE LIKE
Howard C. Gohs, Syosset, and Joseph F. Budnick, Bellerose, N.Y., assignors to Electrical Fittings Corporation, Woodside, N.Y., a corporation of New York
Filed June 26, 1961, Ser. No. 119,590
2 Claims. (Cl. 248—74)

This invention relates to a mounting clamp for cradling and rigidly holding axial electrical conduit, plumbing pipe and the like.

It is the principal object of the invention to provide an improved conduit or plumbing pipe clamp for rigidly holding such conduit, pipe or the like along a mounting surface, such as a vertical wall or ceiling.

It is a further object of the invention to provide an improved clamp as noted hereinbefore which, in particular, may be stamped and formed of heavy wall steel stock to provide economy and simplicity in fabrication and use.

Further objects and advantages will become apparent from the description of the invention taken in conjunction with the figures, in which:

FIG. 1 is an elevational view in perspective of a clamp incorporating the features of the invention;

FIG. 2 is a side elevational view of the clamp depicting same mounted to a vertical wall and pivotally bent to receive conduit;

FIG. 3 is a side elevational view in section taken along line 3—3 of FIG. 4 and illustrates the clamp in clamping status attached firmly to the vertical wall;

FIG. 4 is a front elevational view of the clamp with conduit clamped thereto; and FIG. 5 is a sectional view taken along line 5—5 of FIG. 3.

Reference is now made to the figures for a detailed description of a clamp 10 incorporating the principles of the invention. In this embodiment, clamp 10 is shaped, formed and stamped out of strip steel stock. Essentially, clamp 10 includes a vertical back support 11 which serves as a web for a pair of outstanding parallel spaced apart side walls 12, 13. Each side wall 12, 13 has a substantially circular recess 14, 15 and a horizontal slot 16, 17, respectively, to define upper and lower confronting curved clamping surfaces 14a, b and 15a, b for extending around a substantial portion of the outer surface periphery of an axial length of conduit 18 clamped thereby, as illustrated in FIGS. 3 and 4. These figures disclose heavy wall tubular electrical conduit cradled in clamp 10. In like manner, clamp 10 is capable of holding thin wall electrical malleable tubing and the various types of electrical flexible conduit. As known in the electrical art, the conduits serve as raceways for one or more electrical wires, not shown herein. In the same manner, plumbing pipe or like tubing may be supported by clamp 10.

Slot 16 is open ended in the plane of the pair of curved surfaces 14a, b and extends rearwardly to a closed end 19 at back support 11. Similarly, slot 17 is open ended in the plane of curved surfaces 15a, b and extends back to a closed end 20 at back support 11. Essentially, each side wall 12, 13 constitutes upper and lower jaw members separated by an individual slot 16, 17, whereby the jaw surfaces thereoef 14a, b and 15a, b and the the separating slot 16, 17 in each side wall is axially aligned along a horizontal level with those in the other side wall. Consequently, the clamped conduit is gripped in two parallel planes 21, 22 axially spaced apart along its outer surface by the two pairs of jaw members, as shown in FIG. 4.

In fabrication, clamp 10 is preformed to have an elongated vertical opening 23, a pair of raised edges 24 and an upper recess 25 in back support 11. The fabricated clamp 10 is also bent V-shaped about a horizontal line from side wall to side wall, as shown in FIG. 2, at 26 to prepare same for mounting against a flat support 27, such as a wall or ceiling. The apical region 28 of bend 26 is spaced from wall 27 and is substantially horizontally level with the ends 19, 20 of slots 16, 17. A projection 29 at the upper end of back support 11 is equipped to abut against wall 27 upon mounting of clamp 10 to such wall. Projection 29 is above the horizontal level of the apical region 28 of bend 26, whereas long opening 23 is below same. Clamp 10 is fastened to wall 27 by a threaded screw 30 passing through opening 23 and into wall 27. The lower edge 31 of the mounted clamp also bears against wall 27.

As seen from the figures, slots 16, 17 permit mutual separation and mutual convergence of the individual pair of jaw members. Consequently, when fabricated and thus prior to clamping, clamp 10 is bent as described hereinbefore to spread apart the coacting jaw surfaces 14a, b and 15a, b, as shown in FIG. 2. Such separation is taken up by the individual slots 16, 17 which spread apart, whereby the outer opposed ends 32—32 and 33—33 of the coacting jaw surfaces are sufficiently spaced apart to permit passage of an axial length of conduit 18 passed same and into the seat defined by the clamping jaws, as depicted by the arrow in FIG. 2. The vertical separation S between points 32—32 and 33—33 may be set so that standard conduit may be hammer tapped or manually snapped into its cradle during an installation of the conduit. At this stage of the installation, screw 30 has not yet been tightened to complete clamping so that there is sufficient resiliency and give in clamp 10 to permit the jaws momentarily to open an additional small amount to permit snap insertion of the conduit into jaw members. The jaws then return or close a small amount to prevent the conduit falling out of its cradle. After conduit 18 is snapped past points 32—32 and 33—33 and is cradled in jaw members, it need no longer be held by the electrician. Under normal circumstances, conduit 18 will not fall out of its cradle even if clamp 10 is mounted to a ceiling, as long as the separation S is less than the diameter of the conduit. This frees both hands of the installer for the completion of the installation and thus affords increased efficiencies when employing such clamp.

The final step of clamping requires tightening of screw 30 which draws apical region 28 of bend 26 to flatten against wall 27. In a sense, this action causes the jaw members in each side wall to pivot about the apex 28 of the V so as to close jaw surfaces 14a, b and 15a, b tightly around conduit 18. Such converging action of jaw members is taken up by the individual slots 16, 17 which close upon themselves. If the screw member is driven in tightly, the rear face of back support 11 flattens towards the wall or ceiling 27, as the case may be, and projection 29 presses hard against wall 27 to make the attachment rigid and firm. The surface area of projection 29 is preferably relatively large to prevent substantial digging or wedging of projection 29 into wall or ceiling support 27 when clamp 10 is being tightened against such wall or ceiling during clamping of conduit 18, particularly, if such wall or ceiling 27 is made of soft material, such as pine wood. To obtain optimum clamping operation, it is desirable that projection 29 press against the surface of wall 27 without wedging therein so as to offset clamp 10 from wall 27 at an angle as shown in FIG. 3. This angular offset in co-operation with the fact that edge 31 bears against wall 27 and the fact that screw 30 is below the horizontal level of the pivot axis at 28, assures that clamp 10 bends about the pivot axis 28 upon tightening of screw 30. The clamped conduit 18 is substantially coaxial with jaw surfaces 14a, b and 15a, b.

It will be understood that clamp 10 may be suitably dimensioned, whereby the distance D of the center of the clamped conduit 18 from wall 27, FIG. 3, is the same as the distance of the center of a side knockout in a standard outlet box (not shown) from such wall so that conduit 18 may extend straight into a box mounted to wall 27 through its side knockout without being offset. Clamp 10 may be used for conduits of various diametrical sizes. If the clamp is preformed so that separation S between jaw points 32—32 and 33—33 is too gerat to hold temporarily conduit 18 in its cradle before final clamping, the installer, after inserting conduit into its cradle, may tighten up on screw 30 until reasonable holding is achieved to work elsewhere along the installation; or as an alternative, the installer may complete tightening of each individual clamp before he proceeds to another clamp along the installation. Conversely, if separation S is not large enough to snap or tap conduit 18 past points 32—32 and 33—33, then the installer may bend clamp 10 further with pliers to increase the separation.

It is intended that all matter contained in the above description or shown in the accompanying drawings shall be interpreted as illustrative and not in a limiting sense.

What is claimed is:

1. A clamp for conduit or the like comprising, a back support for fixed attachment to a wall surface, a pair of spaced wall coextending in like direction outwardly from said back support, each coextending wall having a pair of jaw members defined by confronting clamping surfaces, each wall also having a slot provided with an open end in the plane of said clamping surfaces thereof and an opposite closed end adjacent said back support, said pairs of jaw members forming a seat for receiving a tubular conduit or the like, said pairs of jaw members also having outer ends forming a separation through which said tubular conduit is inserted upon positioning same into said seat, said wall slots allowing mutual separation and mutual convergence of the correlated pairs of jaw members, respectively, to seat an axial length of conduit and to clamp same between said members, said back support being temporarily bent in an outwardly direction so as to space the region of said back support adjacent the closed ends of said slots relatively far from said wall surface thereby resulting in the outer ends of said jaw members to be spaced apart for insertable seating of the tubular conduit therein, the temporarily bent back support being braced against said wall surface at its upper and lower ends at opposite sides of the apex of the bend, and means engaging said back support for bending same about the closed slot ends in a direction to converge the open slot ends and also the outer ends of said jaw members therewith for clamping said seated conduit, said back support being relatively flattened against said wall surface upon said last-mentioned bending operation, said means being laterally off-set with respect to said jaw members to permit accessibility and operation of said means after said conduit is seated in said jaw members.

2. Apparatus as defined in claim 1 wherein, said back support including a re-enforced open ended slot extending lengthwise between the apex of the back support bend and one end of upper and lower back support ends, said last-mentioned means including a bolt member held by said lengthwise slot and designed for engaging said wall surface whereupon tightening of said bolt member causes the temporarily bent back support to flatten against said wall surface as the second end of said back support upper and lower ends slides along said wall surface during flattening motion.

References Cited in the file of this patent
UNITED STATES PATENTS 2,795,834     Szoke _____ June 18, 1957

FOREIGN PATENTS 433,085     Great Britain _____ Aug. 8, 1935
553,047     Great Britain _____ May 5, 1943